April 23, 1946.   R. W. McLAREN   2,399,053
RIGHT ANGLED ALIGNING AND ASSEMBLING FASTENER BRACKET
Filed Feb. 19, 1943

Inventor
Roy W. McLaren

By Clarence A. O'Brien
and Harvey B. Jacobson
Attorneys

Patented Apr. 23, 1946

2,399,053

UNITED STATES PATENT OFFICE 2,399,053

RIGHT-ANGLED ALIGNING AND ASSEMBLING FASTENER BRACKET

Roy W. McLaren, Oaklyn, N. J.; Helen H. McLaren, administratrix of said Roy W. McLaren, deceased Application February 19, 1943, Serial No. 476,449

1 Claim. (Cl. 113—99)

The present invention relates to novel and improved fastener brackets especially designed for positioning, lining up and securing plates and the like for welding.

By way of introduction, and to pave the way for a more adequate understanding of the subject matter and claims of this application, it is to be pointed out that it possesses recognized continuity similar to fixtures or brackets constituting the subject matter of a copending application identified as Serial No. 466,817, filed in the United States Patent Office by me under date of November 24, 1942.

In the previous copending application alluded to there is involved a method assembling complemental plate members or the like which consists first in tack-welding a pair of duplicate companion assembling and holding brackets to predetermined spots or areas on said members; secondly, the bringing of matchable palm or abutment portions of these brackets into abutting as well as shiftable contact, and then inserting and driving a drift pin, of predetermined style and form, through apertures in the abutting portions to locate said portions in predetermined relationship and to hold the plate members in accurately assembled relationship to then be accurately welded together.

Further, and with reference to the structure in co-pending application, Serial No. 466,817, and broadly speaking, the bracket per se comprises a body including a flat apertured abutment palm adapted for strain and stress distribution and work aligning and assembling purposes, and coordinated means for attaching the abutment to the work, said means being disposed at a laterally deflected substantially acute angle to the body portion or major area of said abutment palm. More specifically, the bracket includes what have been described as two end plates and an intermediate plate connecting the end plates, the intermediate plate being angularly related with respect to the end plates, one end plate being adapted for spot welding to the work and the second end plate being provided with apertures or openings to accommodate the aforementioned drift pin.

In carrying out the specific principles of the instant and improved fastener bracket, I have evolved ways and means of utilizing two abutments, these being disposed at right angles to each other and there being parallel flanges connected therewith and designed for tack-welding to the plates or other work. Thus, instead of having two end plates and an intermediate plate, the construction is simplified so that the two end plates or abutments coordinate with side flanges, as it were, said flanges being ideal for tack-welding and securing purposes.

Other features and advantages of the invention will become more readily apparent from the following description and the accompanying illustrative drawing.

In the drawing, wherein like numerals are employed to designate like parts throughout the same:

Figure 1:
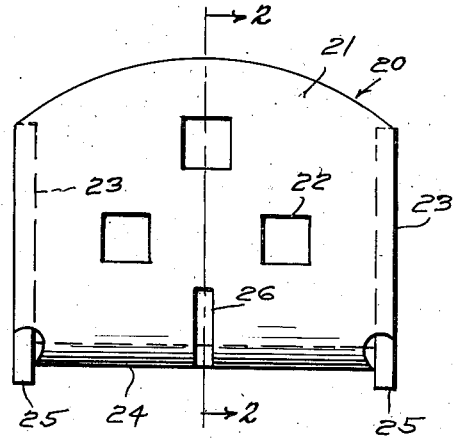
Figure 1 is a front elevation of a fastener bracket constructed in accordance with my invention.
Figure 2:
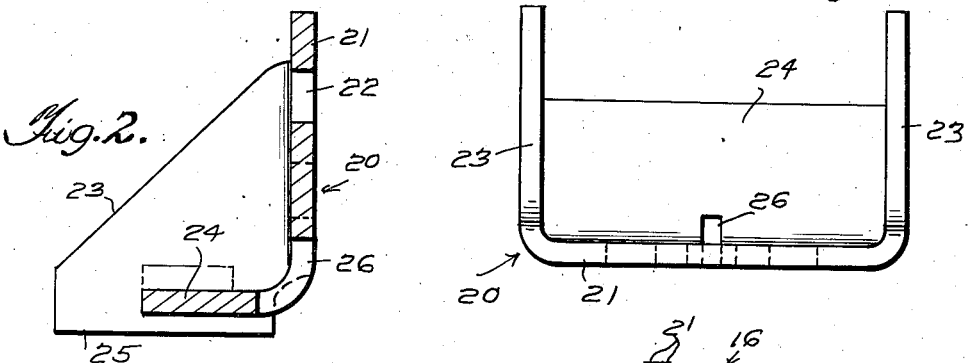
Figure 2 is a section on the line 2—2 of Figure 1.
Figure 3:
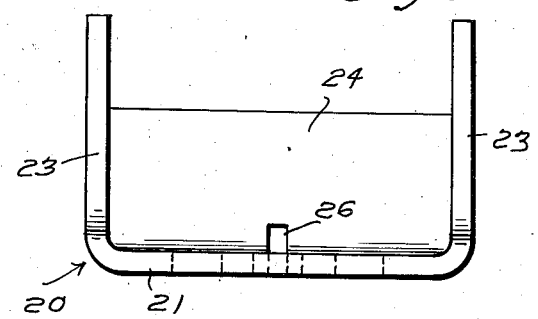
Figure 3 is a top plan view.
Figure 4:
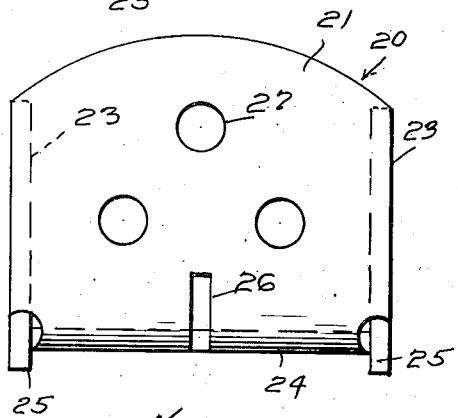
Figure 4 is a front view, like Figure 1, showing circular holes instead of rectangular or square holes.
Figure 5:
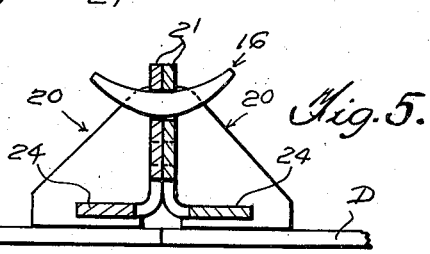
Figure 5 is a reduced view showing how these so-called right angled fasteners lend themselves admirably well to lining up two ship plates in the same plane for final welding purposes.

Reference being had now to Figures 1 to 5, inclusive, the so-called right angled type bracket or fastener is denoted, generally speaking, by the reference numeral 20. This particular bracket is characterized by a slat abutment web for properly positioning, aligning and securing plates for welding, said abutment being denoted by the numeral 21. It is of general rectangular form and provided with a plurality of square holes or apertures 22 to accommodate either a drift pin 16 (see Figure 5) or bolt (not shown), as the case may be. Formed integral therewith and extending at right angles therefrom are parallel, substantially triangular tack-welding flanges 23. Spanning the space between the flanges 23 is an extension 24 bent at right angles from the lower edge of the abutment 12 and occupying a plane above the tack-welding surfaces or edges 25 of said flanges 23. At the juncture of the abutment 21 and its extension 24, there exists a centrally arranged slot 26, this to accommodate a detent element on a jig structure (not shown).

It is to be noted that the extension 24 occupies an elevated plane in respect to the attaching or tack welding edges 25 to provide for slight irregularities in the matching up of plate members. Reference being had to the small view identified as Figure 5, it will be seen how the brackets are used and paired together. Here the work parts or plate members to be assembled and welded are denoted by the reference characters C and D, The respective flanges 23 are tack-welded to the adjacent surfaces of the plates C and D within the vicinity of the abutting edges so as to occupy proper positions when brought into interconnecting relationship shown. Thus, the flanges serve to tentatively arrange the abutments 21, whereby, through the use of the tapered rectangular drift pin 16, the abutments can be shifted and brought into proper position, leaving the drift pin in place, or employing both, as desired. Incidentally, the circular holes 27 are suitably adaptable to bolts (not shown) which are sometimes used for holding the pairs of fastener brackets together until the welding operation is completed.

The novel fastener brackets, when in use, will open the way to another time and material saver in shipbuilding—that of "no recut after sub-assembly." Almost all plated areas, with the exception of floors and intercostals, are fabricated with surplus length and width. After welding has been completed, templates are applied and lines scribed on the steel and cut. This wastes both shipfitters' and burners' time, as well as acetylene and air. Use of these fasteners will permit tolerances of plus or minus $\frac{3}{32}$ of an inch on the abutting edge of T connections. Where the tolerance is minus, the continuous member is held at its correct position and weld metal fills the gap and produces, if anything, a stronger joint than if the abutting member was up tight.

Use of these fastener brackets largely eliminates tack-welding when sub-assemblies are combined in final assemblies because of their great aligning and securing power. After alignment and security have been obtained by the fasteners, the non-fastener side of the work is welded. The fasteners are then no longer required and can be removed and the fastener side of work welded.

Adoption of this fastener for use will give impetus to wider use of jigging than has been the case up to now. Jigging does not have to be done under cover. All that is necessary is sufficient assembly area with stable platens and crane capacity to move the sub-assemblies after they have been welded.

It is proposed to work our plans for any type of steel ship under construction in the order of their importance in terms of man hours. Even ships as small as steel barges can be built using these fasteners with considerable saving of time.

It is thought that persons skilled in the art to which the invention relates will be able to obtain a clear understanding of the invention after considering the description in connection with the drawing. Therefore, a more lengthy description is regarded as unnecessary.

Minor changes in shape, size and rearrangement of details coming within the field of invention claimed may be resorted to in actual practice, if desired.

I claim:

As a new article of manufacture, an automatic fastener in the form of a heavy duty plate assembling, aligning, and fastening bracket, said bracket being especially useful in lining up plates in a plane with one another and comprising a single body including a pair of vertically extending parallel end flanges having their lower horizontal edges disposed in a plane with one another and adapted to be temporarily tack-welded to an associated work plate, a substantially flat abutment web between said flanges, said abutment web being disposed, when in use, at right angles to the work plate and being provided at points inwardly of its perimeter edges with a plurality of apertures to accommodate either a drift pin or bolt, as the case may be, the lower end of said abutment web being bent at right angles and forming a horizontal extension projecting between said flanges, said extension being disposed on the plane elevated above the tack-welding edges of said flanges.

ROY W. McLAREN.